US011586978B2

(12) United States Patent
Amadieu et al.

(10) Patent No.: US 11,586,978 B2
(45) Date of Patent: Feb. 21, 2023

(54) DEVICE, SYSTEM AND METHOD FOR PROVIDING PROVIDER OBJECTS FROM A CACHE

(71) Applicant: AMADEUS S.A.S., Biot Sophia Antipolis (FR)

(72) Inventors: Olivier Amadieu, Biot (FR); Yara Kazma, Biot (FR); Philippe Beaudequin, Biot (FR); Edward Oubrayrie, Biot (FR); Jean-Marie Cazorla, Biot (FR); Ludovic Sailley, Biot (FR); Jean-Sebastien Thireau, Grasse (FR)

(73) Assignee: AMADEUS S.A.S., Biot (FR)

( * ) Notice: Subject to any disclaimer, the term of this patent is extended or adjusted under 35 U.S.C. 154(b) by 713 days.

(21) Appl. No.: 16/656,799

(22) Filed: Oct. 18, 2019

(65) Prior Publication Data

US 2021/0117849 A1    Apr. 22, 2021

(51) Int. Cl.
 *G06F 16/29* (2019.01)
 *G06F 16/2457* (2019.01)
 *G06F 16/957* (2019.01)
 *G06N 20/00* (2019.01)
 *H04W 4/029* (2018.01)

(52) U.S. Cl.
 CPC ....... *G06N 20/00* (2019.01); *G06F 16/24573* (2019.01); *G06F 16/29* (2019.01); *G06F 16/9574* (2019.01); *H04W 4/029* (2018.02)

(58) Field of Classification Search
 None
 See application file for complete search history.

(56) References Cited

U.S. PATENT DOCUMENTS

| 7,693,894 B1 | 4/2010 | Fay et al. |
| 8,849,793 B2 | 9/2014 | Vexler |
| 8,898,184 B1 | 11/2014 | Garman |
| 9,818,136 B1 * | 11/2017 | Hoffberg ................. G07F 17/32 |

(Continued)

FOREIGN PATENT DOCUMENTS

| CA | 2388624 C | * | 7/2011 | ............... G06F 8/20 |

OTHER PUBLICATIONS

Shukla et al., "Dynamic Pricing for Airline Ancillaries with Customer Context", Feb. 6, 2019, arXiv:1902.02236 [stat.ML], https://doi.org/10.48550/arXiv.1902.02236 (Year: 2019).*

(Continued)

*Primary Examiner* — Davoud A Zand
(74) *Attorney, Agent, or Firm* — Perry + Currier, Inc.

(57) ABSTRACT

A device, system and method for providing provider objects from a cache is provided. Provider objects are received representing items provided by provider systems. The provider objects are categorized by reusability and/or context characteristics and stored as categorized. A request is received for one or more items provided by the one or more provider systems. A stored and categorized provider object is determined to meet criteria associated with the request, including one or more of a respective reusability and respective context characteristics of the provider object. In response to determining that the provider object, that meets the criteria, is estimated to be currently valid, a response corresponding to the provider object is provided.

17 Claims, 7 Drawing Sheets

(56) References Cited

U.S. PATENT DOCUMENTS

| | | | | |
|---|---|---|---|---|
| 2008/0120129 A1* | 5/2008 | Seubert | ............... | G06Q 40/125 |
| | | | | 705/305 |
| 2011/0093853 A1* | 4/2011 | Bobak | ............... | H04L 41/0654 |
| | | | | 718/100 |
| 2016/0260182 A1* | 9/2016 | Garman | ............... | G06Q 10/02 |
| 2019/0171438 A1* | 6/2019 | Franchitti | ............... | G06N 20/00 |

OTHER PUBLICATIONS

Lenz et al., "Concept for a Multimodal Business Travel Portal: Identification of a Holistic Business Travel Process and the Required Functional Building Blocks", Jan. 1, 2015, IEEE, 2015 48th Hawaii International Conference on System Sciences (pp. 1410-1421) (Year: 2015).*

Dar, Shaul, et al. "Semantic data caching and replacement." VLDB. vol. 96. 1996.

Luo, Qiong, et al. "Middle-tier database caching for e-business." Proceedings of the 2002 ACM SIGMOD international conference on Management of data. 2002.

Degenaro, L., et al. "A middleware system which intelligently caches query results." Lecture notes in computer science, (2000): vol. 1795, 24-44.

* cited by examiner

| CXR | ORI | DES | DATE | PTC | PAX | PUB | TTL | ID | FL# | COST | #Bags | Context |
|---|---|---|---|---|---|---|---|---|---|---|---|---|
| Air France | NCE | YYZ | 301219 | ADT | 1 | Yes | 1 Hr | 3RG5 | AF123 | $550 | 1 | For French Customers |
| Air France | NCE | YYZ | 301219 | ADT | 1 | Yes | 30 Min | 8YT2 | AF456 | $560 | 2 | For US Customers |
| Air France | NCE | YYZ | 301219 | ADT | 1 | Yes | 30 Min | 6UY6 | AF789 | $540 | 1 | For UK Customers |

DEVICE, SYSTEM AND METHOD FOR PROVIDING PROVIDER OBJECTS FROM A CACHE

FIELD

The specification relates generally to databases, and specifically to a device, system and method for providing provider objects from a cache.

BACKGROUND

The provision of various products, including for example travel-related goods and services (e.g. flights, hotel reservations, and the like) typically requires various discrete entities to exchange data defining various aspects of the products. Examples of such entities, in the context of travel-related products, include airlines, travel agencies, end users, reservation systems, and the like. Although such entities may be configured to exchange data according to a standardized format (e.g. according to the eXtensible Markup Language (XML)-based New Distribution Capability (NDC) standard in the context of travel-related products), they may nonetheless employ different mechanisms to initiate the exchange of data.

SUMMARY

An aspect of the present specification provides a method comprising: receiving, at one or more servers, provider objects representing items provided by one or more provider systems; categorizing, at the one or more servers, the provider objects by one or more of reusability and context characteristics; storing, by the one or more servers, at one or more memories, the provider objects as categorized; receiving, at the one or more servers, from a requesting device, a request for one or more items provided by the one or more provider systems; determining at the one or more servers, that a provider object, stored at the one or more memories, meets criteria associated with the request, including one or more of a respective reusability and respective context characteristics of the provider object; and in response to determining that the provider object, that meets the criteria, is estimated to be currently valid, providing, by the one or more servers, to the requesting device, a response corresponding to the provider object.

Another aspect of the present specification provides a server comprising: one or more memories; a communication interface; and a controller configured to: receive, via the communication interface, provider objects representing items provided by one or more provider systems; categorize the provider objects by one or more of reusability and context characteristics; store, at the one or more memories, the provider objects as categorized; receive, via the communication interface, from a requesting device, a request for one or more items provided by the one or more provider systems; determine that a provider object, stored at the one or more memories, meets criteria associated with the request, including one or more of a respective reusability and respective context characteristics of the provider object; and in response to determining that the provider object, that meets the criteria, is estimated to be currently valid, provide, via the communication interface, to the requesting device, a response corresponding to the provider object.

Another aspect of the present specification provides a non-transitory computer-readable medium storing a computer program, wherein execution of the computer program is for: receiving, at one or more servers, provider objects representing items provided by one or more provider systems; categorizing, at the one or more servers, the provider objects by one or more of reusability and context characteristics; storing, by the one or more servers, at one or more memories, the provider objects as categorized; receiving, at the one or more servers, from a requesting device, a request for one or more items provided by the one or more provider systems; determining at the one or more servers, that a provider object, stored at the one or more memories, meets criteria associated with the request, including one or more of a respective reusability and respective context characteristics of the provider object; and in response to determining that the provider object, that meets the criteria, is estimated to be currently valid, providing, by the one or more servers, to the requesting device, a response corresponding to the provider object.

BRIEF DESCRIPTIONS OF THE DRAWINGS

For a better understanding of the various examples described herein and to show more clearly how they may be carried into effect, reference will now be made, by way of example only, to the accompanying drawings in which:

FIG. 7 depicts examples of provider objects as categorized, according to non-limiting examples.

DETAILED DESCRIPTION

Figure 1:
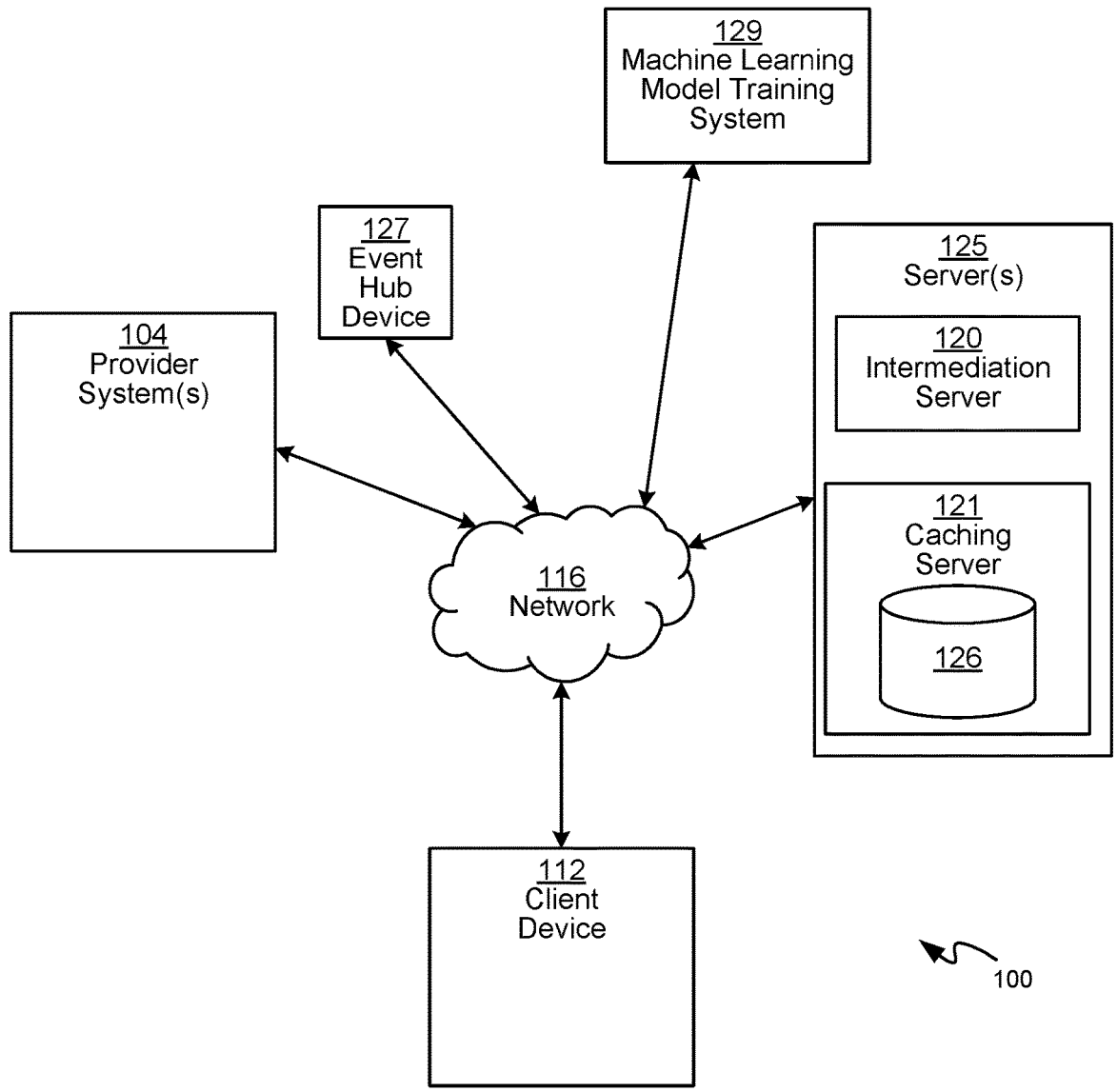
FIG. 1 depicts a system for providing provider objects from a cache, according to non-limiting examples.

FIG. 1 depicts a system 100 for providing provider objects from a cache. The provider objects, in the examples discussed herein, may comprise data objects and/or data records which correspond to products and/or items, such as travel-related goods and services (e.g. flights, hotel reservations, car rentals and the like), provided by a provider system. More specifically, the products and/or items discussed in the examples below may be flight tickets and related services (e.g. baggage check services, in-flight food, entertainment and the like). However, the systems and methods discussed below can also be applied to various other types of data objects and/or items.

Delivery of the items mentioned above is typically controlled by a provider entity, such as an airline in the case of the items discussed in connection with the examples provided herein. The system 100 includes one or more provider systems 104 (e.g. one or more servers or other suitable computing devices), which in this example is operated by one or more provider entities. The system 100 can include a plurality of provider systems 104, each operated by respective provider entities (e.g. other airlines), although only one provider system 104 is shown for illustrative purposes. The provider objects may be in any suitable format including, but not limited to Edifact recommendations in the context of Global Distribution System (GDS)-based data exchange, offer records in the context of New Distribution Capability (NDC)-based data exchange, and/or any other suitable format. Indeed, the provider objects may comprise data objects and/or data records, for example storing an Edifact recommendation or an NDC offer, and/or any other suitable data representing at least one item provided by the provider system 104.

Each provider object defines an item, or a combination of items, which may be offered for purchase (e.g. by end users of the items) including, but not limited to one or more of flights, train rides, hotel stays, airport lounge access, seat upgrades, baggage check services, in-flight food, entertainment and the like.

In the examples discussed below, each provider object may define a flight operated by the provider entity, and/or ancillary services associated with the flight. Each provider object therefore contains various fields. Certain fields define item attributes, such as product object identifiers (e.g. service identifiers, item identifiers, product identifiers and the like), locations, dates and times corresponding to the products (e.g. flight times and other itinerary data). The type of fields and/or data of a provider object may depend on a type of a provider object. For example, provider objects corresponding to flights may include flight identifiers, whereas provider objects corresponding to other travel-related items, such as an offer for a train ride, a hotel, accessing an airport lounge and/or an offer for a premium seat upgrade, may include information related to the train ride, the hotel, the lounge, the premium seat, etc.

As will be described below, the system 100 further comprises a network 116 and an intermediation server 120. The network 116 comprises any suitable combination of local and wide area networks, including the Internet, such that the components of the system 100 may communicate. The intermediation server 120 generally intermediates between the client device 112 and the provider system 104, for example such that the client device 112 may request products from the provider system 104, and/or more than one provider system 104, via the intermediation server 120.

As depicted, the system 100 further comprises a caching server 121, which caches and/or stores provider objects received from various sources in the system 100 including, but not limited to, the provider system 104. As will be explained below, the caching server 121 further provides responses that include provider objects stored at a cache to a requesting device, such as the client device 112, for example via the intermediation server 120. While the servers 120, 121 may be two separate devices, the functionality of the servers 120, 121 may be combined into one server 125 and/or implemented in a cloud computing environment using a plurality of servers and/or one or more servers.

As depicted, the caching server 121 maintains a cache and/or a memory 126, which may be implemented as one or more memories. The memory 126 contains provider objects as received at the caching server 121 from various sources of provider objects in the system 100. The caching server 121 may implement machine learning models to categorize provider objects by one or more of reusability and context characteristics, and store the provider objects at the memory 126 as categorized; the caching server 121 may further determine whether a stored and categorized provider object is currently valid, as described in more detail below.

The client device 112, in the present example, may be operated by a travel agent entity, and therefore generates and transmits requests for provider objects (e.g. representing products which may be for purchase), to the provider system 104, via the intermediation server 120, on behalf of end users (e.g. travelers). The system 100 can include a plurality of client devices 112, although only one client device 112 is shown in FIG. 1 for illustrative purposes. Put another way, the intermediation server 120 intermediates between the client device 112 and the provider system 104 and receives requests from the client device 112.

As will be explained in more detail below, in some examples, prior to the intermediation server 120 requesting a provider object from the provider system 104, which corresponds to at least one item provided by the provider system 104, the intermediation server 120 may request the provider object from the caching server 121 which determines whether a provider object, stored at the memory 126, meets criteria associated with the request, including one or more of a respective reusability and respective context characteristics of the provider object.

Furthermore, when a provider object stored at the memory 126, is determined to meet the criteria, the caching server 121 may estimate whether the provider object is estimated to be currently valid. When the provider object is estimated to be currently valid, the caching server 121 provides the provider object to the intermediation server 120 which transmits the provider object to the client device 112 in response to the request.

Hence, previously received, stored, and categorized provider objects may be used, by the intermediation server 120, to respond to the request, rather than requesting a provider object that meets the criteria from the provider system 104. Such an example may reduce time in responding to the request as compared to requesting a provider object that meets the criteria from the provider system 104. Furthermore, such an example may further reduce bandwidth usage between intermediation server 120 and the provider system 104, as well as reduce processing resources at the provider system 104, for example in generating another provider object that meets similar criteria used to previously generate a provider object (e.g. the provider object stored at the memory 126 used to respond to the request).

In yet other examples, the intermediation server 120 may first request provider objects that meet the criteria of a request from the provider system 104. When the provider system 104 does not respond within a given threshold time period (which may be a fixed time period and/or a dynamic time period based on historical response times for the provider system 104 at a time the provider objects are requested), intermediation server 120 may communicate with the caching server 121 to provide a provider object, to the client device 112, that meets the criteria of a request. In such examples, the provider system 104 may be down and/or busy, and hence, such examples may again reduce the time for responding to a request as compared to waiting for the provider system 104 to respond.

In general, requesting and/or ordering items represented by provider objects occur in the system 100 via exchange of messages, for example between the intermediation server 120 and the provider system 104. Such messages may hence be associated with provider objects, and may include messages for one or more of: requesting provider objects; requesting further information associated with provider objects; providing provider objects; ordering items represented by provider objects, and the like.

Furthermore, the intermediation server 120 may provide provider objects to the client device 112 as received from the provider system 104 and/or the intermediation server 120 may alter the provider objects to another format, for example as described in Applicant's co-pending application titled "DEVICE, SYSTEM AND METHOD FOR INTERMEDIATION BETWEEN A PROVIDER SYSTEM THAT PROVIDES PROVIDER OBJECTS AND A CLIENT DEVICE", having U.S. patent application Ser. No. 16/656,768, which issued as U.S. Pat. No. 11,276,094, filed on Oct. 18, 2019, a same day as the present specification, and incorporated herein by reference.

As depicted, the system 100 further comprises an event hub device 127, which may receive messages associated with provider objects, from the provider system 104. The event hub device 127 may comprise a proxy for at least the intermediation server 120 such that messages received by at least the intermediation server 120 are received at the event hub device 127. For example, when the provider system 104 transmits a message and/or a response to the intermediation server 120 that includes a provider object, the message and/or the response may first be received at the event hub device 127 and then transmitted to the intermediation server 120. Put another way, when provider objects are requested from a provider system, the provider objects may be pushed to the event hub device 127 to make them accessible to other components of the system 100, other than a current instance of the intermediation server 120, as described in more detail below. Indeed, the event hub device 127 may be configured to receive messages and/or responses that include provider objects from all provider systems 104 of the system 100. Such "traffic" may be "live" and include messages generated due to provider objects requested by the client device 112. However, in other examples, such traffic may not be "live"; in these examples, a component of the system 100, such as a traffic generator, which may be a component of the intermediation server 120 and/or a separate component, and the like, may automatically and/or periodically request provider objects from one or more provider systems 104 via messages, for example to have a record of offers for flights to given locations on particular days; such requests may be transmitted and/or triggered by the intermediation server 120.

The caching server 121 generally receives, from the event hub device 127 provider objects generated by the provider system 104 for storage at the memory 126. For example, the event hub device 127 may push messages and/or provider objects to the caching server 121 and/or the caching server 121 may request messages and/or provider objects from the event hub device 127.

As depicted, the system 100 further comprises a machine learning model training system 129 which may receive messages from the event hub device 127, and generate machine learning classifiers for machine learning models implemented at the caching server 121, for example as described in Applicant's co-pending application titled "DEVICE, SYSTEM AND METHOD FOR TRAINING MACHINE LEARNING MODELS USING MESSAGES ASSOCIATED WITH PROVIDER OBJECTS", having U.S. patent application Ser. No. 16/656,820, which issued as U.S. Pat. No. 11,367,017, filed on Oct. 18, 2019, a same day as the present specification, and incorporated herein by reference.

Before discussing the functionality of the system 100 in greater detail, certain components of the caching server 121 will be discussed in greater detail with reference to FIG. 2. While the caching server 121 is described as a stand-alone device and/or separate from the intermediation server 120, in other examples, the functionality of the caching server 121 may be distributed between other components of the system 100 and/or the functionality of the caching server 121 may be at least partially combined with the intermediation server 120.

Figure 2:
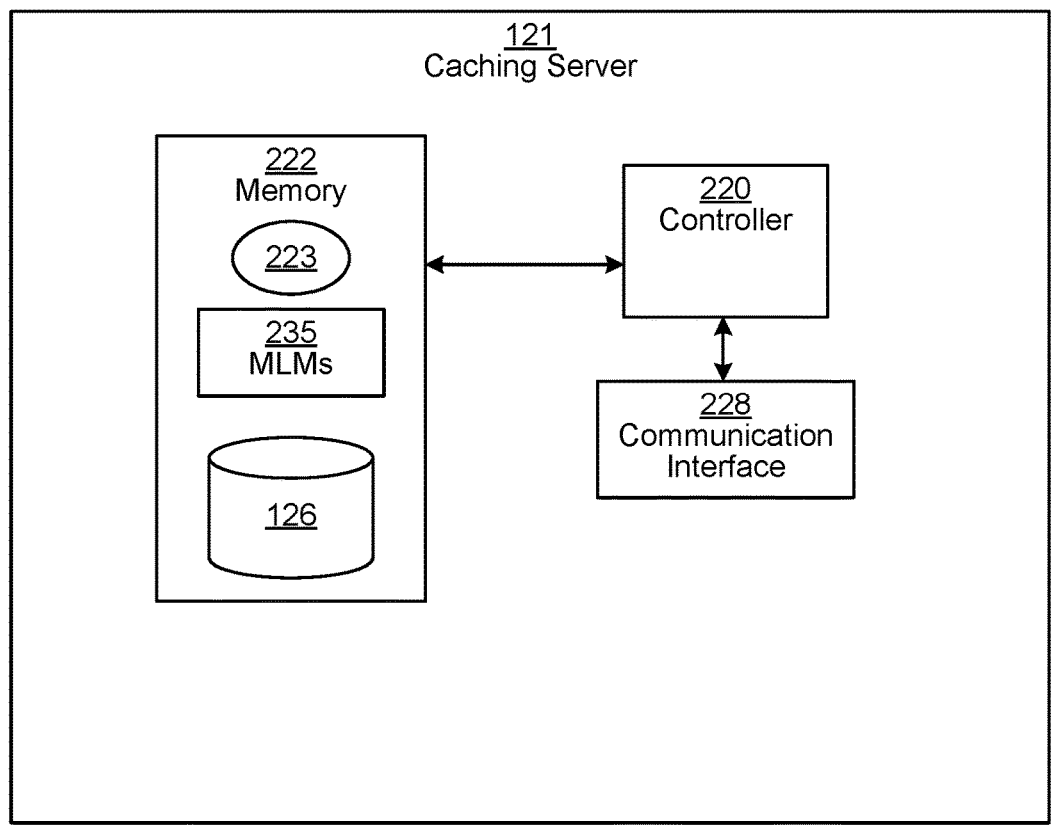
FIG. 2 depicts an example structure of one or more servers for storing and providing provider objects, according to non-limiting examples.

As shown in FIG. 2, the caching server 121 includes at least one controller 220, such as a central processing unit (CPU) or the like. The controller 220 is interconnected with a memory 222 storing an application 223, the memory 222 implemented as a suitable non-transitory computer-readable medium (e.g. a suitable combination of non-volatile and volatile memory subsystems including any one or more of Random Access Memory (RAM), read only memory (ROM), Electrically Erasable Programmable Read Only Memory (EEPROM), flash memory, magnetic computer storage, and the like). The controller 220 and the memory 222 are generally comprised of one or more integrated circuits (ICs).

The controller 220 is also interconnected with a communication interface 228, which enables the caching server 121 to communicate with the other components of the system 100 (e.g., the intermediation server 120, the event hub device 127, and the like) via the network 116. The communication interface 228 therefore includes any necessary components (e.g. network interface controllers (NICs), radio units, and the like) to communicate via the network 116. The specific components of the communication interface 228 are selected based upon the nature of the network 116. The caching server 121 can also include input and output devices connected to the controller 220, such as keyboards, mice, displays, and the like (not shown).

The components of the caching server 121 mentioned above can be deployed in a single enclosure, or in a distributed format. In some examples, therefore, the caching server 121 includes a plurality of processors, either sharing the memory 222 and communication interface 228, or each having distinct associated memories and communication interfaces.

As depicted, the memory 222 may include the memory 126 (and/or a portion thereof). However, in other examples, memory 126 may be external to the caching server 121, and accessible to the controller 220, for example via the communication interface 228. Indeed, the memory 126 may be distributed between any suitable components of the system 100.

The memory 222 also stores a plurality of computer-readable programming instructions, executable by the controller 220, in the form of various applications, including the application 223. As will be understood by those skilled in the art, the controller 220 executes the instructions of the application 223 (and any other suitable applications) in order to perform various actions defined by the instructions contained therein. In the description below, the controller 220, and more generally the caching server 121, are said to be configured to perform those actions. It will be understood that they are so configured via the execution (by the controller 220) of the instructions of the applications stored in memory 222.

Execution of the application 223, as will be discussed below, configures the caching server 121 to: receive provider objects representing items provided by one or more provider systems 104; categorize the provider objects by one or more of reusability and context characteristics; store, at the one or more memories 126, the provider objects as categorized; receive, from a requesting device (e.g., the client device 112), a request for one or more items provided by the one or more provider systems 104; determine that a provider object, stored at the one or more memories 126, meets criteria associated with the request, including one or more of a respective reusability and respective context characteristics of the provider object; and in response to determining that the provider object, that meets the criteria, is estimated to be currently valid, provide, to the requesting device, a response corresponding to the provider object.

While the application 223 may be implemented programmatically, in other examples the application 223 may be implemented using machine learning models. In still other examples, the application 223 may combine a programmatical implementation with an implementation using machine learning models. Indeed, as depicted, the memory 222 further stores machine learning models ("MLMs") 235 which may be used, by the controller 220, to categorize the provider objects by one or more of reusability and context characteristics, and determine whether a provider object is currently valid.

The machine learning models 235 may include machine learning and/or deep-learning and/or neural network-based models and/or algorithms, and the like including, but are not limited to: a generalized linear regression model; a random forest model; a support vector machine model; a gradient boosting regression model; a decision tree model; a generalized additive model; evolutionary programming models; Bayesian inference models, reinforcement learning models, and the like. However, any suitable machine learning model and/or deep learning model and/or neural network model is within the scope of present examples.

While structure of the provider system 104, the client device 112, the intermediation server 120, the event hub device 127 and the machine learning model training system 129 is not described in detail, the provider system 104, the client device 112, the intermediation server 120, the event hub device 127 and the machine learning model training system 129 may have a similar structure as the caching server 121, but adapted for the respective functionality of the provider system 104, the client device 112, the intermediation server 120, the event hub device 127 and the machine learning model training system 129.

Figure 3:
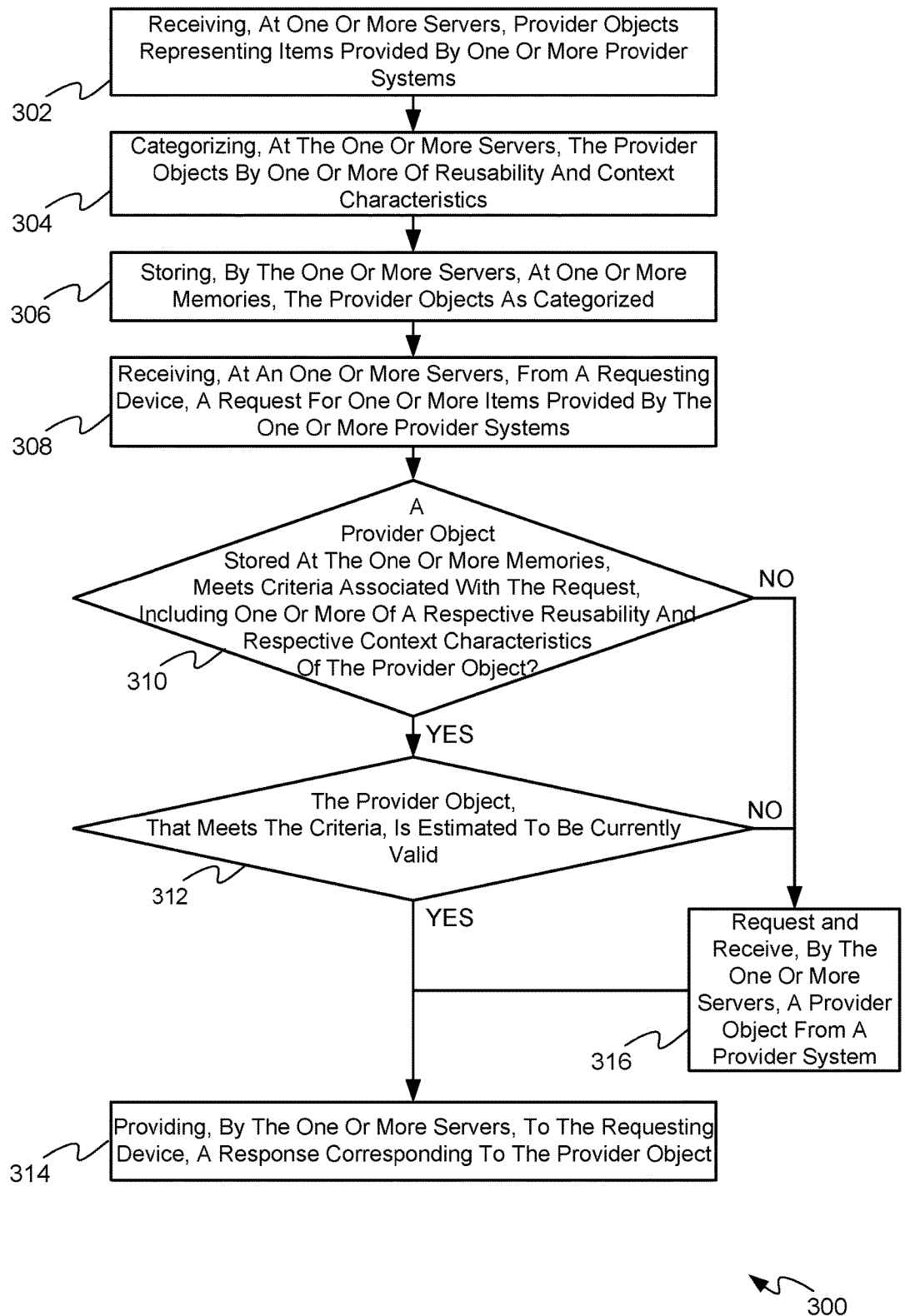
FIG. 3 depicts a method for providing provider objects from a cache, according to non-limiting examples.

Attention is now directed to FIG. 3 which depicts a flowchart representative of a method 300 for providing provider objects from a cache. The operations of the method 300 of FIG. 3 correspond to machine readable instructions that are executed by the caching server 121, and specifically the controller 220. In the illustrated example, the instructions represented by the blocks of FIG. 3 are stored at the memory 222 for example, as the application 223 (and/or the machine learning models 235). The method 300 of FIG. 3 is one way in which the controller 220 and/or the caching server 121 and/or the system 100 may be configured. Furthermore, the following discussion of the method 300 of FIG. 3 will lead to a further understanding of the system 100, and its various components.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the system 100 of FIG. 1, as well. In particular, while the method 300 is described as being implemented by the caching server 121, the functionality of the caching server 121 may be combined into a single computing device which implements the method 300. Alternatively, the functionality of the caching server 121 may be distributed between a plurality of servers and/or computing devices which implement the method 300; for example, a different computing device may be used to implement each machine learning model 235. As such, blocks of the method 300 may be implemented by one or more servers and/or computing devices At a block 302, the controller 220 and/or one or more servers receives provider objects representing items provided by one or more provider systems 104.

In some examples, the provider objects may be received as messages (e.g. in an eXtensible Markup Language (XML) format) associated with provider objects representing items provided by one or more provider systems 104. In some examples the messages may have more than one format. The messages may be associated with provider objects which may comprise NDC offers, or Edifact recommendations (e.g. according to a GDS format), and the like, and/or be in any suitable format; the format, etc. of the messages may hence depend on capability of the provider systems 104 and/or sources of the messages, and/or whether the provider systems 104 and/or sources of the messages are operating according to a NDC or GDS based data exchange format, and/or another type of data exchange format.

Furthermore, the messages may be received from the event hub device 127; indeed, the controller 220 and/or the one or more servers may receive all messages received at the event hub device 127. However, the messages may be received from any suitable source of the messages in the system 100.

At a block 304, the controller 220 and/or one or more servers categorizes the provider objects by one or more of reusability and context characteristics.

In examples where categorizing the provider objects by reusability occurs, such categorization may include, but is not limited to: categorizing the provider objects by one or more of: respective characteristics; and respective combinations of one or more respective items represented by the provider objects (e.g. the respective items comprising products provided by the provider systems 104; however the respective items represented by the provider objects may correspond to criteria included in a request from the client device 112 as described in more detail below).

In examples where categorizing the provider objects by context characteristics occurs, such categorization may include, but is not limited to: categorizing the provider objects by one or more of a respective context in which a respective provider object was requested, a customization, a geographic location, a customer type, and a category of respective items represented by the provider objects. For example, a provider object may be customized according to a geographic location from which a request that resulted in a provider object was received and/or a whether the provider object is for customers having an airline loyalty card and/or for customers having a particular airline loyalty status, and the like (e.g. a customer type) and/or whether a provider object is public or private (e.g. for anyone, or for particular customers).

For example, the controller 220 and/or one or more servers may categorize the provider objects using the machine learning models 235.

In one example, a given machine learning model 235 may comprise a reusability determining machine learning model for categorizing a provider object according to reusability, which may include, but is not limited to: categorizing the provider object by one or more of respective characteristics of the provider object and respective combinations of one or more respective items represented by the provider object. For example, the characteristics used to categorize the provider object may be characteristics of the provider object itself, such as a flight for a given day, as represented by the provider object, whether the provider object is for a particular class of seat of the flight (e.g. economy, premium, business, first, and the like), a passenger type code (e.g. whether an offer is for an adult, a child, etc.), a number of bags included for the flight, whether an offer is public (may be offered to anyone) or private (may be offered only to a given person and/or persons) and the like. Hence, for example, the provider object for a given flight on a given day, for a given class and a given number of bags may be categorized as reusable for requests for the flight on the given day, for the given class and the given number of bags; however, the provider object may not be reusable for requests for the flight on the given day, for the given class but for a different number of bags.

In another example, a given machine learning model 235 may comprise a context determining machine learning model for categorizing a provider object according to context characteristics, which may include, but is not limited to: categorizing the provider object by one or more of a respective context in which a respective provider object was requested, a customization, a geographic location, a customer type, and a category of respective items represented by the provider object. In particular, provider objects provided by a provider system 104 may be customized according to certain types of characteristics of a request for the provider object, such as the context characteristics listed above. For example, a given price of a provider object and/or items offered by a provider object, and the like, may be customized according to context characteristics of a request for the provider object (e.g. a request that originates in England for a given flight may result in a provider object that is different from a request, for the given flight, that originates in France). Put another way, a provider system 104 may implement a set of rules, and/or context logic, when providing a provider object in response to a request; categorizing a provider object according to context characteristics may include categorizing the provider object in a manner that simulates (and the like) the set of rules/or context logic implemented by the provider system 104. Such categorization may alternatively be referred to as segmentation in that a provider system 104 may provide provider objects in a segmented and/or contextual manner.

Hence, the block 304 may include using a reusability determining machine learning model 235 and a context determining machine learning model 235 to respectively categorize the provider objects by the reusability and the context characteristics.

At a block 306, the controller 220 and/or one or more servers stores, at the one or more memories 126, the provider objects as categorized.

At a block 308, the controller 220 and/or one or more servers receives, from a requesting device, a request (e.g. a message) for one or more items provided by the one or more provider systems 104. For example, a request may include criteria (e.g. for a flight, such as an origin, a destination, a date, and the like) that may be used to search the provider objects stored at the memory 126. Such criteria may correspond, at least in part, to one or more categories of reusability and context characteristics by which the provider objects are stored at the memory 126. A request for one or more items provided by the one or more provider systems 104 may generally be generated by the client device 112 (e.g., a requesting device may comprise the client device 112) and received at the intermediation server 120, which may request the one or more items provided by the one or more provider systems 104 from the caching server 120. Hence, at the block 308, a requesting device from which a request is received (e.g. at the caching server 121) may comprise the client device 112 and/or the intermediation server 120.

At a block 310, the controller 220 and/or one or more servers determines whether a provider object, stored at the one or more memories 126, meets the criteria associated with the request, including one or more of a respective reusability and respective context characteristics of the provider object.

For example, determining that the respective reusability of the provider object meets the criteria associated with the request may comprise: determining that the provider object represents one or more of same characteristics and a same combination of the one or more items requested by the request.

Similarly, determining that the respective context of the provider object meets the criteria associated with the request may comprise: determining that the provider object represents one or more of a same respective context of the request, a same customization, a same geographic location, a same customer type, and a same category of the one or more items requested by the request.

When a provider object, stored at the one or more memories 126, meets criteria associated with the request (e.g. a "YES" decision at the block 310), at a block 312, the controller 220 and/or one or more servers determines whether the provider object that meets the criteria, is estimated to be currently valid.

For example, a given machine learning model 235 may comprise a validity estimation machine learning model for determining a criticality and/or a validity of a provider object which may include, but is not limited to, determining whether the provider object is currently valid. For example, a provider object may include a time-to-live (TTL) field which generally indicates a length of time that a provider designates the provider object to be valid (e.g. a length of time, such as 30 minutes, an offered price for a flight may be valid). However provider objects may be valid for longer than the length of time of the TTL field; for example, a flight associated with the provider object may be six months from a date that the provider object was generated, and an offered price may not change and/or expire for a given time period that is longer than the length of time of the TTL field (e.g. four months), and/or the given time period may be based on loads (e.g. of flights) and/or seasonality. Hence, in these examples, the given machine learning model 235 may determine criticality and/or a validity of a provider object by determining that a current time does not exceed one or more of an estimated expiry time and an estimated (or non-estimated) TTL value of a provider object. Indeed, the terms criticality and validity may be used interchangeably.

Hence, the method 300 may further comprise using, at controller 220 and/or one or more servers, a validity estimation machine learning model 235 to determine that the provider object (stored at the one or more memories 126) is estimated to be currently valid.

When the provider object that meets the criteria is estimated to be currently valid (e.g. a "YES" decision at the block 312), at a block 314, the controller 220 and/or one or more servers provides, to the requesting device, a response corresponding to the provider object (e.g., stored at the one or more memories 126).

When the controller 220 and/or one or more servers determines, at the block 310 that no provider object meets the criteria associated with the request (e.g. a "NO" decision at the block 310) and/or when the controller 220 and/or one or more servers determines, at the block 312 that the provider object that meets the criteria is not currently valid (e.g. a "NO" decision at the block 312), at a block 316 the controller 220 and/or one or more servers may request and receive, from the provider system 104, a provider object that meets the criteria. In contrast to the remainder of the method 300, the block 316 may be implemented by the intermediation server 120 and not the caching server 121. When a provider object that meets the criteria is received from the provider system 104 (e.g. rather than retrieved from the one or more memories 126), in another example of the block 314, the controller 220 and/or one or more servers provides, to the requesting device, a response corresponding to the provider object as received from the provider system 104; in these examples of the block 314, the intermediation server may provide the response. Furthermore, provider object that meets the criteria may be received via the event hub device 127 which provides the provider object to the caching server 121 for storage at the one or more memories 126.

Alternatively, the block 316 may be implemented, prior to the block 310 and, when no response is received from the provider system 104 within a threshold time period, the block 310 may be implemented. Indeed, any suitable criteria for the intermediation server 120 determining whether to request a provider object from the caching server 121 or the provider system 104 is within the scope of the present specification. For example, the intermediation server 120 may include rules and/or instructions implemented by a controller thereof, to determine when to request a provider object from the caching server 121 or the provider system 104. For example a request from the client device 112 may be highly personalized and/or customized for a given user (e.g. a customer) and the intermediation server 120 may implement rules that force a request for a highly personalized and/or customized provider object (e.g. based on data in the request) to be requested from the provider system 104. Similarly, a request from the client device 112 may be for a high quality provider object (e.g. as determined using predefined rules, which may include, for example an indication of a longer response time being acceptable) and the intermediation server 120 may implement rules that force a request for a high quality provider object to be requested from the provider system 104. However, any other criteria for bypassing the caching server 121 are within the scope of the present specification.

When no provider objects are determined to meet the criteria of the request and/or no valid provider objects meet the criteria of the request, the response returned at the block 314 may be a null response.

While aspects of the method 300 have been generally described with respect to one provider object being provided in response to a request, it is understood that the method 300 may be used to provide a plurality of provider objects in response to a request. For example, the caching server 121 may: determine (e.g. at the block 310 and the block 312) that a plurality of provider objects, stored at the one or more memories 126, meets criteria associated with the request, including one or more of a respective reusability and respective context characteristics of the provider object; and in response to determining that the plurality of provider objects, that meets the criteria, is estimated to be currently valid, provide, to the requesting device, a response corresponding to the plurality of provider objects. In yet further examples, one or more servers may implement the block 316 in parallel with the block 310, the block 312 and the block 314, such that the plurality of provider objects provided to the requesting device includes provider objects from the one or more memories 126 and provider objects received from the provider system 104. The remainder of the method 300 may be adapted accordingly.

Figure 4:
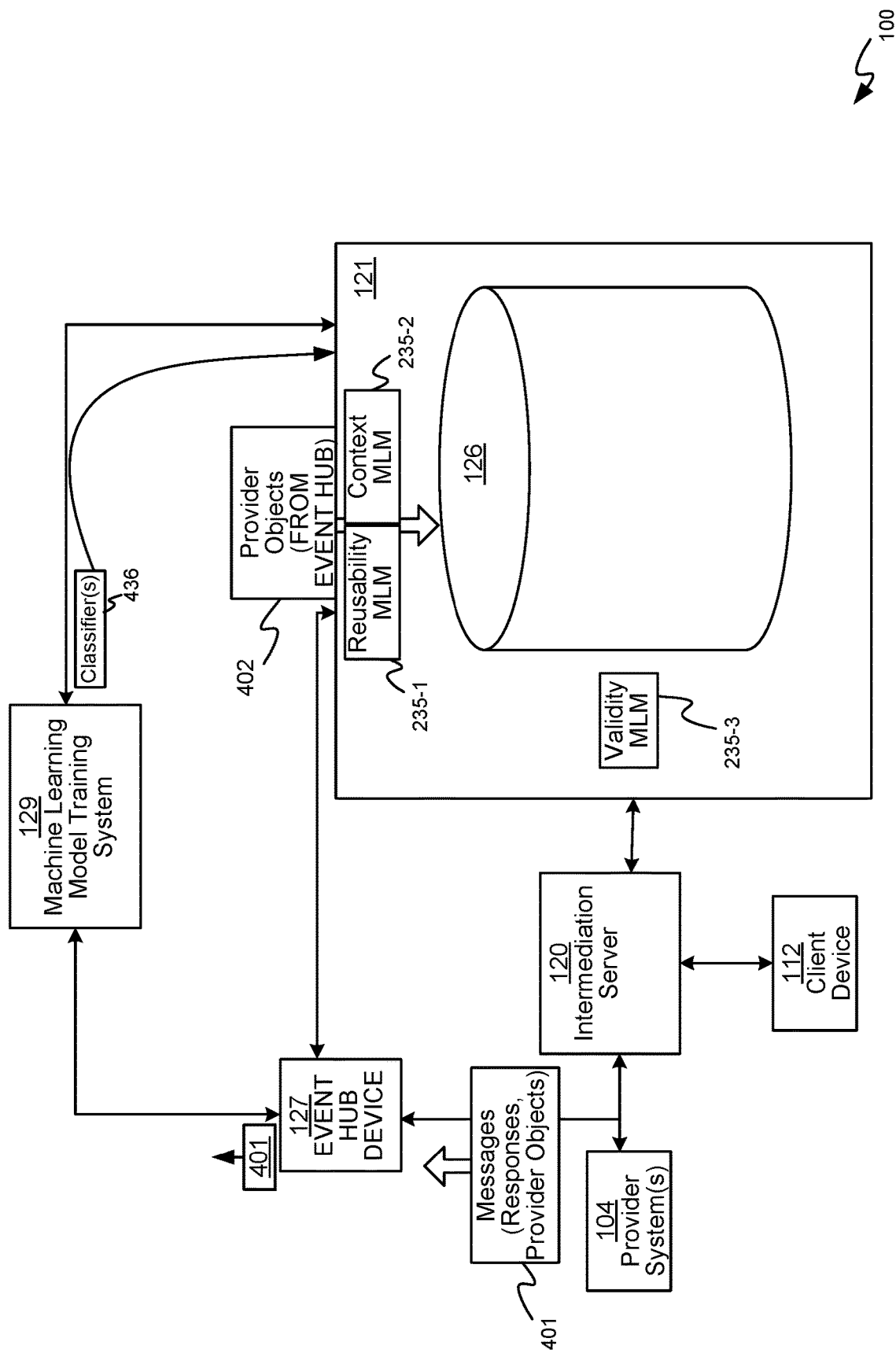
FIG. 4 depicts the system of FIG. 1 training machine learning modules to provide provider objects from a cache, according to non-limiting examples.

An example of the method 300 is next described, including an example of training the machine learning models 235. Attention is first directed to FIG. 4, which depicts the system 100, but without the network 116. Rather FIG. 4 shows communication links between the components of the system 100 which are represented as double ended-arrows therebetween; such communication links may include the network 116. Otherwise, FIG. 4 is similar to FIG. 1, with like components having like numbers. In particular, FIG. 4 depicts an example of example of training the machine learning models 235 as implemented at the caching server 121.

In FIG. 4, the event hub device 127 is receiving messages 401 from the provider system 104 as described above. The messages 401, as depicted, include provider objects, and the like. The event hub device 127 provides the messages 401 to the machine learning model training system 129 which generates classifiers 436 for the machine learning models 235 and provide the classifiers 436 to the corresponding machine learning models 235 implemented at the caching server 121.

For example, as depicted, the caching server 121 is implementing a reusability determining machine learning model 235-1, a context determining machine learning model 235-2, and a validity estimation machine learning model 235-3. As such, the machine learning model training system 129 generates suitable classifiers 436 for each of these machine learning models 235 implemented at the caching server 121.

As depicted, the event hub device 127 further provides provider objects 402 of the messages 401 to the caching server 121. While the provider objects 402 are depicted as being different from the messages 401, the provider objects 402 may be received at the caching server 121 in the form of the messages 401.

Figure 5:
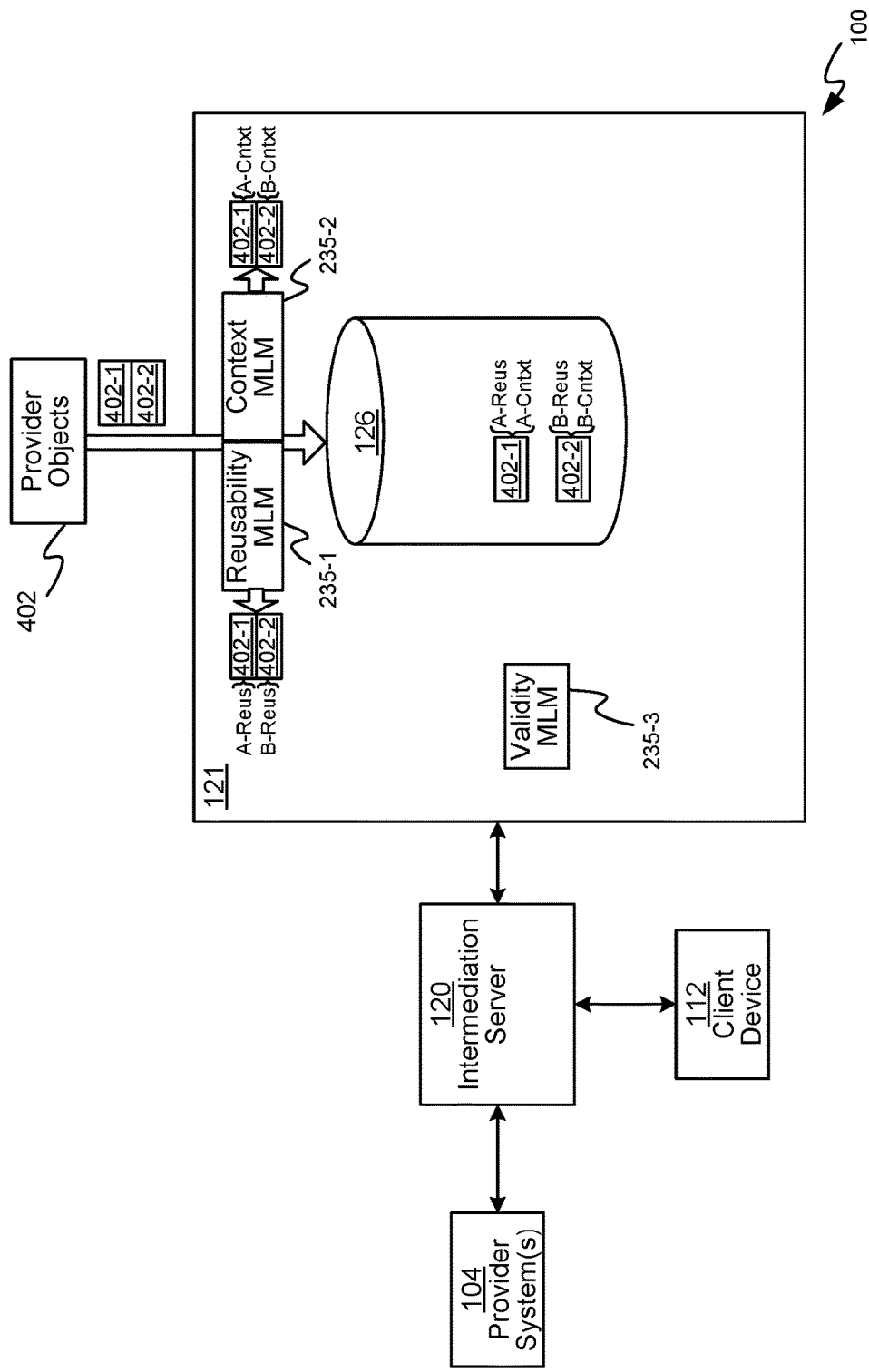
FIG. 5 depicts the system of FIG. 1 categorizing provider objects for storage in a cache, according to non-limiting examples.
Figure 6:
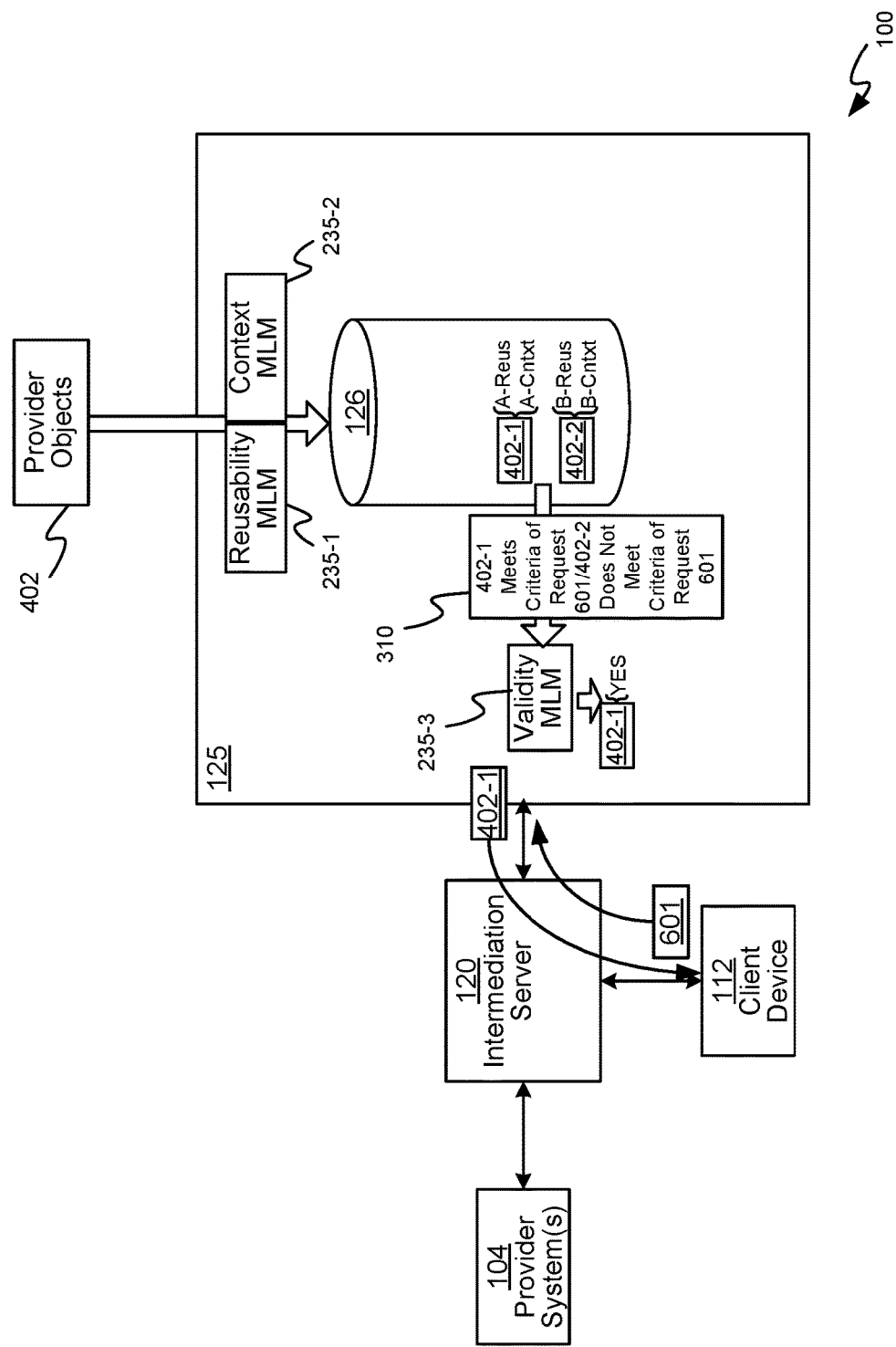
FIG. 6 depicts the system of FIG. 1 providing a provider object to a requesting device based on a current validity of the provider object, according to non-limiting examples.

Attention is next directed to FIG. 5 and FIG. 6 which depicts an example of the method 300.

Attention is first directed to FIG. 5, which is substantially similar to FIG. 4 but without the machine learning model training system 129, with like components having like numbers. FIG. 5 depicts the caching server 121 receiving (e.g. at the block 302) two provider objects 402-1, 402-2.

As depicted, the caching server 121 implements the machine learning models 235-1, 235-2 to categorize (e.g. at the block 304 of the method 300) the provider objects 402-1, 402-2 according to reusability and context characteristics.

As depicted, the machine learning model 235-1 categorizes the provider object 402-1 according to a category "A" of reusability, and categorizes the provider object 402-2 according to a category "B" of reusability. Similarly, the machine learning model 235-2 categorizes the provider object 402-1 according to a category "A" of context characteristics, and categorizes the provider object 402-2 according to a category "B" of context characteristics. While such an example is simplistic, it is understood that the machine learning models 235-1, 235-2 may categorize the provider objects 402-1, 402-2 according to any suitable categories of reusability and/or context characteristics and/or any other suitable categories (e.g., as indicated by the machine learning classifiers 436). A provider object 402 may be categorized according to more than one category; more detailed examples of provider objects, as categorized, are described below with respect to FIG. 7.

For example, the caching server 121 may categorize the provider objects 402-1, 402-1 by reusability by categorizing the provider objects 402-1, 402-1 by one or more of respective characteristics and respective combinations of one or more respective items represented by the provider objects 402-1, 402-1.

Similarly, the caching server 121 may categorize the provider objects 402-1, 402-1 by context characteristics by categorizing the provider objects by one or more of a respective context in which a respective provider object 402-1, 402-1 was requested, a customization, a geographic location, a customer type, and a category of respective items represented by the provider objects 402-1, 402-1. Indeed, as described above, categorizing the provider objects 402-1, 402-1 according to context characteristics may include categorizing the provider object in a manner that simulates (and the like) a set of rules/or context logic implemented by the provider system 104. As also described above, such categorization may alternatively be referred to as segmentation as a provider system 104 may provide provider objects in a segmented and/or contextual manner.

Furthermore, while as depicted the provider objects 402-1, 402-2 are categorized according to both reusability and context characteristics, in other examples the provider objects 402-1, 402-2 may be categorized according to one or more of reusability and context characteristics.

As depicted, the caching server 121 stores (e.g. at the block 306 of the method 300), at the memory 126, the provider objects 402-1, 402-2 as categorized. As depicted, the provider object 402-1 is stored in association with indicators of a category "A" of reusability and a category "A" of context characteristics. Similarly, the provider object 402-2 is stored in association with indicators of a category "B" of reusability and a category "B" of context characteristics.

While only two provider objects 402-1, 401-2 are depicted as being stored and categorized at the memory 126, any suitable number of the provider objects 402 may be stored at the memory 126, as categorized by the machine learning models 235-1, 235-2.

Attention is next directed to FIG. 6, which substantially similar to FIG. 5, with like components having like numbers. In particular, FIG. 6 depicts the caching server receiving (e.g. at the block 308 of the method 300), from the intermediation server 120, a request 601 for one or more items provided by the one or more provider systems 104, such as a flight, and the like. For example, as depicted the request was generated by the client device 112 and transmitted to the intermediation server 120 which provides the request 601 to the caching server 121. The request 601 may include criteria (e.g. for the flight, such as an origin, a destination, a date, and the like) that may be used to search the provider objects 402 stored at the memory 126. Such criteria may correspond, at least in part, to one or more categories of reusability and context characteristics by which the provider objects 402 are stored at the memory 126.

In particular, rather than request a provider object that represents the item from the provider system 104, the intermediation server 120 may first use the request 601 to request the item from the caching server 121 which determines whether one or more provider objects 402, stored at the memory 126, meets the criteria associated with the request 601, for example one or more of a respective reusability and respective context characteristics of the provider object 402.

As depicted, the caching server 121 is determining (e.g. at the block 310 of the method 300) that the provider object 402-1, meets criteria associated with the request 601.

For example, the caching server 121 may determine that the reusability of the provider object 402-1 meets the criteria associated with the request 601 by determining that the provider object 402-1 represents one or more of same characteristics and a same combination of one or more items requested by the request 601. However, as depicted, the caching server 121 may determine that the reusability of the provider object 402-2 does not meet the criteria associated with the request 601 by determining that the provider object 402-2 does not represent one or more of same characteristics and a same combination of one or more items requested by the request 601. While present examples are described with respect to the reusability of one provider object meeting the criteria associated with the request 601, in other examples, the reusability of more than one provider object may meet the criteria associated with the request 601.

Similarly, the caching server 121 may determine that the respective context of the provider object 402-1 meets the criteria associated with the request 601 by determining that the provider object 402-1 represents one or more of a same (and/or similar) respective context of the request 601, including, but not limited to, a same (and/or similar) customization, a same (and/or similar) geographic location, a same (and/or similar) customer type, and a same (and/or similar) category associated with the request 601 and/or of the one or more items requested by the request 601.

The caching server 121 estimates (e.g. at the block 312 of the method 300) the validity of the provider object 402-1 using the machine learning model 235-3 (e.g. and the machine learning classifiers 435-3). As depicted, the provider object 402-1 is determined to be valid (e.g. "YES" the provider object 402-1 is valid)

In response to determining that the provider object 402-1 meets the criteria associated with the request 601, and as the provider object 402-1 is valid, the caching server 121 provides (e.g. at the block 314 of the method 300) the provider object 402-1 to the intermediation server 120 which provides the provider object 402-1 to the client device 112, for example by transmitting the provider object 402-1 as a message 401. The provider object 402-1 (e.g. the message 401 that includes the provider object 402-1) may also be received at the event hub device 127 and provided to the machine learning model training system 129 for use in training the machine learning models 235, as described above.

While as depicted only one valid provider object 402-1 that meets the criteria of the request 601 is provided to the client device 112, a plurality of valid provider objects 402 that meets the criteria of the request 601 may be provided to the client device 112 including, but not limited to, tens to hundreds of provider objects 402.

In examples where no valid provider object 402 that meets the criteria of the request 601 is stored at the memory 126, the intermediation server 120 may request (e.g. at the block 316 of the method 300) provider objects 402 that meet the criteria of the request 601 from the provider system 104.

In yet further examples, when a provider object 402 stored at the memory 126 meets the criteria of the request 601 but is determined to be invalid, the intermediation server 120 may request provider objects 402 that meet the criteria of the request 601 from the provider system 104, for example to retrieve a newer version of the invalid provider object 402 stored at the memory 126 that meets the criteria of the request 601. In these examples, the caching server 121 may provide an indicator of an invalid provider objects 402 that meet the criteria of the request 601 that may include an identifier of a provider system 104 that originally generated the now invalid provider object 402 such that the intermediation server 120 may retrieve a newer version of the invalid provider object 402 based on the identifier of the provider system 104.

In yet further examples, the intermediation server 120 may first request provider objects 402 that meet the criteria of the request 601 from the provider system 104. When the provider system 104 does not respond within a given threshold time period, the intermediation server 120 may request the provider objects 402 from the caching server 121.

Furthermore, the caching server 121 may update the provider objects 402 stored at the memory 126. For example, the provider objects 402 stored at the memory 126 may be for specific items, such as a specific flight, and the like. When another provider object 402 is received (e.g. at the block 302 of the method 300) which represents a newer version of a provider object 402 already stored and categorized at the memory 126, the newer version of a provider object 402 may be categorized and may replace the provider object 402 already stored and categorized at the memory 126, as described above (e.g. such that reusability, context characteristics and/or validity is also updated).

The examples shown in FIG. 5 and FIG. 6 with respect to categorizing the provider objects 402-1, 402-2 according to "A" and "B" categories are relatively simplistic. Hence, attention is directed to FIG. 7 which depicts examples of provider objects 702 as categorized by the machine learning models 235-1, 235-2 and which may be stored at the memory 126.

While the provider objects 702 are depicted in a tabular format, the provider objects 702 may be stored in any suitable format. In the depicted table, each row corresponds to a particular provider object 702, as categorized, with columns corresponding to various attributes and/or characteristics of the provider objects 702 including, but not limited to, characteristics associated with reusability and context characteristics. As depicted, the provider objects 702 correspond to an offer for flights, with columns defining, for the offers, a carrier ("CXR") of a flight, an origin ("ORI") of a flight, a destination ("DES") of a flight, a passenger type code ("PTC") of the offer (e.g. "ADT" or adult), whether an offer is public ("PUB") (e.g. or private), a "TTL" for offer, an identifier ("ID") of the offer, a flight number ("AF#") of the flight, a cost ("COST") of the offer, a number of bags ("BAGS") for the offer, and a context characteristic ("Context") for the offer.

In particular, the carrier, origin, destination, the TTL, the identifier, the flight number, the cost, passenger type code, whether an offer is public, and the number of bags may be determined using the reusability determining machine learning model 235-1 and may include extracting such information from the provider objects 702 prior to categorization.

The context characteristics may be determined using the context determining machine learning model 235-2. As depicted, for example, each of the provider objects 702 are categorized as to whether a provider object 702 is for customers from different countries. Hence, for example, the provider object 702 of the first row may be provided in response to requests for customers from France, presuming the provider object 702 of the first row otherwise meets the criteria of such requests. Similarly, the provider object 702 of the second row may be provided in response to requests for customers from the United States, presuming the provider object 702 of the second row otherwise meets the criteria of such requests. Similarly, the provider object 702 of the third row may be provided in response to requests for customers from the United Kingdom, presuming the provider object 702 of the third row otherwise meets the criteria of such requests.

When newer provider objects are received that correspond to any of the provider objects 702 as categorized, the provider objects 702 as categorized may be replaced. For example, when a newer provider object is received for Flight Number AF456 (e.g. the provider object 702 of the second row), for example with an updated cost, the provider object 702 of the second row may be replaced with the newer provider object.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, XZ, and the like). Similar logic can be applied for two or more items in any occurrence of "at least one . . . " and "one or more . . . " language.

The terms "about", "substantially", "essentially", "approximately", and the like, are defined as being "close to", for example as understood by persons of skill in the art. In some examples, the terms are understood to be "within 10%," in other examples, "within 5%", in yet further examples, "within 1%", and in yet further examples "within 0.5%".

Persons skilled in the art will appreciate that in some examples, the functionality of devices and/or methods and/or processes described herein can be implemented using pre-programmed hardware or firmware elements (e.g., application specific integrated circuits (ASICs), electrically erasable programmable read-only memories (EEPROMs), etc.), or other related components. In other examples, the functionality of the devices and/or methods and/or processes described herein can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

Persons skilled in the art will appreciate that there are yet more alternative examples and modifications possible, and that the above examples are only illustrations of one or more examples. The scope, therefore, is only to be limited by the claims appended hereto.

What is claimed is:

1. A method comprising:
receiving, at one or more servers, provider objects representing items provided by one or more provider systems;
categorizing, at the one or more servers, the provider objects by one or more of reusability and context characteristics;
storing, by the one or more servers, at one or more memories, the provider objects as categorized;
receiving, at the one or more servers, from a requesting device, a request for one or more items provided by the one or more provider systems;
determining at the one or more servers, that a provider object, stored at the one or more memories, meets criteria associated with the request, including one or more of a respective reusability and respective context characteristics of the provider object; and
in response to determining that the provider object, that meets the criteria, is estimated to be currently valid, providing, by the one or more servers, to the requesting device, a response corresponding to the provider object,
wherein determining that the provider object, that meets the criteria, is estimated to be currently valid comprises: determining that a current time does not exceed one or more of an estimated expiry time and an estimated Time-To-Live (TTL) value of the provider object.

2. The method of claim 1, wherein categorizing the provider objects by reusability comprises: categorizing the provider objects by one or more of respective characteristics and respective combinations of one or more respective items represented by the provider objects; and
determining that the respective reusability of the provider object meets the criteria associated with the request comprises: determining that the provider object represents one or more of same characteristics and a same combination of the one or more items requested by the request.

3. The method of claim 1, wherein categorizing the provider objects by the context characteristics comprises:
categorizing the provider objects by one or more of a respective context in which a respective provider object was requested, a customization, a geographic location, a customer type, and a category of respective items represented by the provider objects; and
determining that the respective context of the provider object meets the criteria associated with the request comprises: determining that the provider object represents one or more of a same respective context of the request, a same customization, a same geographic location, a same customer type, and a same category of the one or more items requested by the request.

4. The method of claim 1, wherein the provider objects comprise one or more of New Distribution Capability (NDC) offers and Edifact recommendations.

5. The method of claim 1, further comprising:
using, at the one or more servers, a reusability determining machine learning model and a context determining machine learning model to respectively categorize the provider objects by the reusability and the context characteristics.

6. The method of claim 1, further comprising:
using, at the one or more servers, a validity estimation machine learning model to determine that the provider object is estimated to be currently valid.

7. A server comprising:
one or more memories;
a communication interface; and
a controller configured to:
receive, via the communication interface, provider objects representing items provided by one or more provider systems;
categorize the provider objects by one or more of reusability and context characteristics;
store, at the one or more memories, the provider objects as categorized;
receive, via the communication interface, from a requesting device, a request for one or more items provided by the one or more provider systems;
determine that a provider object, stored at the one or more memories, meets criteria associated with the request, including one or more of a respective reusability and respective context characteristics of the provider object; and
in response to determining that the provider object, that meets the criteria, is estimated to be currently valid, provide, via the communication interface, to the requesting device, a response corresponding to the provider object,
wherein the controller is further configured to determine that the provider object, that meets the criteria, is estimated to be currently valid by: determining that a current time does not exceed one or more of an estimated expiry time and an estimated Time-To-Live (TTL) value of the provider object.

8. The server of claim 7, wherein the controller is further configured to categorize the provider objects by reusability by:
categorizing the provider objects by one or more of respective characteristics and respective combinations of one or more respective items represented by the provider objects; and
determining that the respective reusability of the provider object meets the criteria associated with the request comprises: determining that the provider object represents one or more of same characteristics and a same combination of the one or more items requested by the request.

9. The server of claim 7, wherein the controller is further configured to categorize the provider objects by context characteristics by:
categorizing the provider objects by one or more of a respective context in which a respective provider object was requested, a customization, a geographic location, a customer type, and a category of respective items represented by the provider objects; and
determining that the respective context of the provider object meets the criteria associated with the request comprises: determining that the provider object represents one or more of a same respective context of the request, a same customization, a same geographic location, a same customer type, and a same category of the one or more items requested by the request.

10. The server of claim 7, wherein the provider objects comprise one or more of New Distribution Capability (NDC) offers and Edifact recommendations.

11. The server of claim 7, wherein the controller is further configured to:

use a reusability determining machine learning model and a context determining machine learning model to respectively categorize the provider objects by the reusability and the context characteristics.

12. The server of claim 7, wherein the controller is further configured to:
use a validity estimation machine learning model to determine that the provider object is estimated to be currently valid.

13. A non-transitory computer-readable medium storing a computer program, wherein execution of the computer program is for:
receiving, at one or more servers, provider objects representing items provided by one or more provider systems;
categorizing, at the one or more servers, the provider objects by one or more of reusability and context characteristics;
storing, by the one or more servers, at one or more memories, the provider objects as categorized;
receiving, at the one or more servers, from a requesting device, a request for one or more items provided by the one or more provider systems;
determining at the one or more servers, that a provider object, stored at the one or more memories, meets criteria associated with the request, including one or more of a respective reusability and respective context characteristics of the provider object; and
in response to determining that the provider object, that meets the criteria, is estimated to be currently valid, providing, by the one or more servers, to the requesting device, a response corresponding to the provider object,
wherein determining that the provider object, that meets the criteria, is estimated to be currently valid comprises: determining that a current time does not exceed one or more of an estimated expiry time and an estimated Time-To-Live (TTL) value of the provider object.

14. The non-transitory computer-readable medium of claim 13, wherein categorizing the provider objects by reusability comprises:

categorizing the provider objects by one or more of respective characteristics and respective combinations of one or more respective items represented by the provider objects; and
determining that the respective reusability of the provider object meets the criteria associated with the request comprises: determining that the provider object represents one or more of same characteristics and a same combination of the one or more items requested by the request.

15. The non-transitory computer-readable medium of claim 13, wherein categorizing the provider objects by the context characteristics comprises:
categorizing the provider objects by one or more of a respective context in which a respective provider object was requested, a customization, a geographic location, a customer type, and a category of respective items represented by the provider objects; and
determining that the respective context of the provider object meets the criteria associated with the request comprises: determining that the provider object represents one or more of a same respective context of the request, a same customization, a same geographic location, a same customer type, and a same category of the one or more items requested by the request.

16. The non-transitory computer-readable medium of claim 13, wherein, wherein the provider objects comprise one or more of New Distribution Capability (NDC) offers and Edifact recommendations.

17. The non-transitory computer-readable medium of claim 13, wherein execution of the computer program is further for:
using, at the one or more servers, a reusability determining machine learning model and a context determining machine learning model to respectively categorize the provider objects by the reusability and the context characteristics.

* * * * *